United States Patent
Smith, Sr.

(10) Patent No.: US 8,055,801 B2
(45) Date of Patent: *Nov. 8, 2011

(54) PULSE-PER-SECOND ATTACHMENT FOR STP

(75) Inventor: Ronald M. Smith, Sr., Wappingers Falls, NY (US); Evangelyn Kay Gardner Smith, legal representative, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 12/246,181

(22) Filed: Oct. 6, 2008

(65) Prior Publication Data

US 2009/0100197 A1 Apr. 16, 2009

Related U.S. Application Data

(63) Continuation-in-part of application No. 11/532,165, filed on Sep. 15, 2006, now Pat. No. 7,451,339.

(51) Int. Cl.
  G06F 15/16 (2006.01)
  G06F 1/00 (2006.01)
(52) U.S. Cl. .......... 709/248; 709/250; 713/500; 702/89; 702/125
(58) Field of Classification Search .................. 709/248, 709/250; 713/400, 500; 702/89, 125
  See application file for complete search history.

(56) References Cited

U.S. PATENT DOCUMENTS

| | | | |
|---|---|---|---|
| 3,932,847 A | 1/1976 | Smith | |
| 5,579,513 A | 11/1996 | Strohmer | |
| 6,104,729 A * | 8/2000 | Hellum et al. | 370/503 |
| 6,209,106 B1 | 3/2001 | Kubala et al. | |
| 6,236,623 B1 | 5/2001 | Read et al. | |
| 6,324,586 B1 | 11/2001 | Johnson | |
| 6,725,278 B1 | 4/2004 | Gonzalez | |
| 6,901,527 B2 | 5/2005 | Gregg | |
| 6,975,653 B2 | 12/2005 | Eidson | |
| 6,981,063 B1 | 12/2005 | Eggers et al. | |
| 7,249,272 B1 * | 7/2007 | Wardrop | 713/400 |
| 7,356,725 B2 | 4/2008 | Engler et al. | |
| 2002/0129290 A1 | 9/2002 | Couillard | |
| 2002/0186716 A1 | 12/2002 | Eidson | |
| 2003/0065963 A1 | 4/2003 | Gregg | |
| 2003/0117899 A1 | 6/2003 | Eidson | |

(Continued)

OTHER PUBLICATIONS

Carrasco, J., "IBM System z9 announcement", IBM power point slides Apr. 27, 2006 [retreived from Internet "http://www.baybunch.org/z9062806.pdf" on Jul. 1, 2010].*

*Primary Examiner* — Saleh Najjar
*Assistant Examiner* — Lashanya R Nash
(74) *Attorney, Agent, or Firm* — Scully, Scott, Murphy & Presser, P.C.; John E. Campbell (57) ABSTRACT

A time synchronization apparatus, method and system are provided. In one aspect, the apparatus comprises at least a time of day clock, a first port operable to receive at least first time information using a first time protocol, a second port operable to receive at least second time information using a second time protocol, a third port operable to receive at least a timing signal, and a time stamp register operable to at least capture current value of the time of day clock upon receipt of the timing signal from the third port or the first time information from the first port or combination thereof.

14 Claims, 5 Drawing Sheets

U.S. PATENT DOCUMENTS

| | | |
|---|---|---|
| 2005/0137822 A1 | 6/2005 | Burch et al. |
| 2006/0009927 A1 | 1/2006 | Osterich et al. |
| 2006/0244501 A1 | 11/2006 | Foerster et al. |
| 2007/0058491 A1 | 3/2007 | Dahlen et al. |
| 2007/0058812 A1 | 3/2007 | Ali et al. |
| 2007/0061605 A1 | 3/2007 | Engler et al. |
| 2008/0037987 A1 * | 2/2008 | Bradley et al. .................. 398/59 |

* cited by examiner

PULSE-PER-SECOND ATTACHMENT FOR STP

CROSS REFERENCE TO RELATED APPLICATION

The present application is a continuation-in-part application of U.S. Ser. No. 11/532,165, filed Sep. 15, 2006, now U.S. Pat. No. 7,451,339, the entire contents of which are incorporated herein by reference.

FIELD OF THE INVENTION

The present disclosure relates generally to timing signals in computer systems, and particularly, to a system and method for achieving accuracy in synchronized time in computer systems that utilize Server Time Protocol (STP).

BACKGROUND OF THE INVENTION

Mainframe server devices such as the zSeries® eServer®, available from assignee International Business Machines, Inc., use protocols for distributing and synchronising time among the client and server computers, for instance, to provide for system integrity in computer systems. In the past, the Time-Of-Day (TOD) clocks in the timing network were synchronized by means of an external box, the 9037 sysplex timer. Each Central Processing Complex (CPC) in the 9037 timing network stepped its TOD clock to the signals from the 9037. Briefly, a CPC refers to a system that may include one or more central processing units (CPUs) and associated hardware units such as main and expanded storage, TOD clocks, and channels that can be configured to operate under the control of an operating system. The stepping signals broadcast by the 9037 required special point-to-point links (called External Time Reference (ETR) links) from the 9037 to each CPC. A representative system implementing ETR offset values for synchronizing logical partitions of a logically partitioned machine is described in commonly-owned U.S. Pat. No. 6,209,106.

The Server Time Protocol (STP), which may replace the ETR as a time protocol in main server devices such as the zSeries®, implements a timing solution that does not include a common stepping signal. Timing information is communicated by means of messages with time stamps and other timing information, and each CPC must keep its TOD clock in step with the rest of the other CPCs by computing offsets and taking action to adjust the TOD clock. This is similar to the action performed by NTP (Network Timing Protocol), the difference being that NTP is normally implemented in a software layer where time stamps can be generated by the control program. The eServer zSeries® architecture has very stringent requirements on the TOD clock; it can be viewed by any problem program, all timestamps must be different, timestamps must never appear to step backwards, and timestamps must appear to be increasing, even when viewed by programs running on different CPUs in the CPC. To make the adjustments to the TOD clock required by the new timing solution, the stepping rate of the TOD clock must be speeded up or slowed down by very fine adjustments, and these adjustments must by observed simultaneously by all CPUs in the CPC.

The ETR architecture provides a means of synchronizing TOD clocks in different CPCs with a centralized time reference, which in turn may be set accurately on the basis of an international time standard. ETR time can be synchronized to international time by connecting an ETR unit (for example, the 9037) to an external time source (ETS). The Server Time Protocol (STP), however, has no easy way to obtain the same level of accuracy with respect to an international time standard that is achieved by the ETR. On the 9037-1, for example, the ETS was connected to the 9037 console by means of an RS-232 interface and the 9037 console was connected to the 9037-1 by means of a General Purpose Interface Bus (GPIB). This achieved an accuracy of about 5 milliseconds and was not considered acceptable to many customers. On the 9037-2 the ETS was connected directly to the 9037-2 by means of an RS-232 interface and an accuracy of about 1 millisecond was achieved. With the 9037-2, a pulse-per-second (PPS) coaxial connector was also added. When the PPS connection is used in conjunction with the RS-232, the 9037-2 can be synchronized to within about 100 microseconds of the PPS signal.

Figure 1:
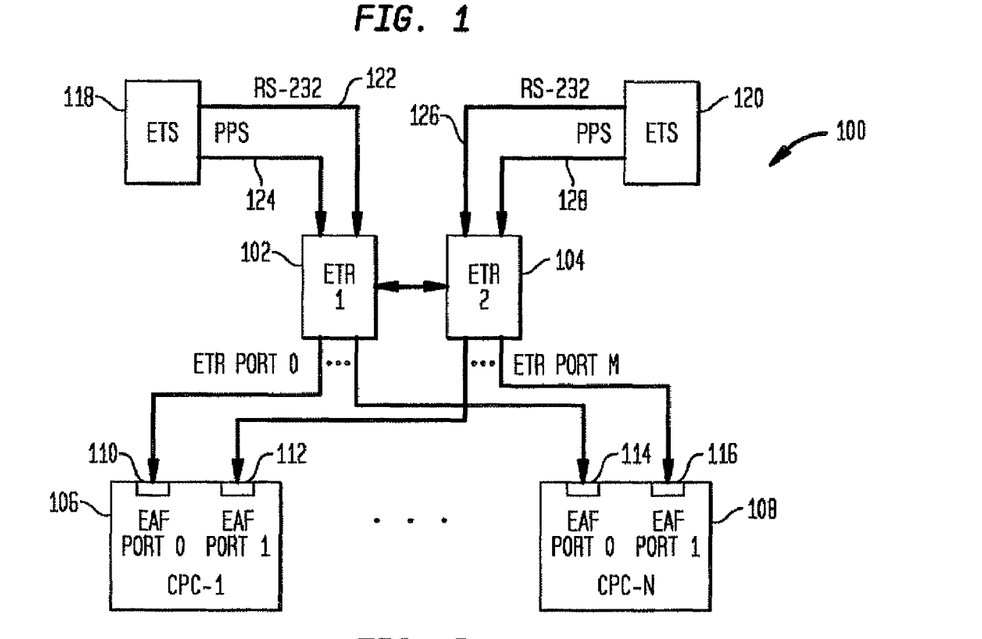
FIG. 1 is a block diagram illustrating high-availability ETR network with ETS, RS-232 and PPS.

FIG. 1 shows a known high-availability ETR network with ETS and PPS. To provide for high availability, most ETR timing networks are designed to have no single point of failure. FIG. 1 shows two ETR units 102, 104 each connected to several servers 106, 108, each called a Central Processing Complex (CPC). The output from each ETR 102, 104 referred to as ETR signal is connected to an ETR attachment facility (EAF) port 110, 112, 114, 116 on each CPC 106, 108. To avoid any single point of failure, a high-availability ETR network 100 has two ETRs 102, 104 and each CPC has connections to both ETRs. Some ETR networks do not have all this redundancy. All CPCs, however, have two ETR ports, whether or not they are in a high availability network.

The external time source (ETS) unit 118, 120 obtains coordinated universal time (UTC) by means of dial-out, GPS, or other mechanism. The ETS unit 118 is connected to an ETR unit 102, for example, IBM 9037, by means of two connections RS-232 122, and optional pulse-per-second (PPS) 124. Similarly, the ETS unit 120 is connected to an ETR unit 104 by means of two connections RS-232 126, and optional pulse-per-second (PPS) 128. The RS-232 connection 122, 126 is used to communicate the time information and a special optional pulse-per-second connector 124, 128 is used to get a highly accurate timing pulse. Without the PPS signal, the accuracy is approximately +/−1.0 milliseconds. With the PPS signal, the accuracy is +/−100 microseconds. The ETR units 102, 104 communicate the timing information to each CPC 106, 108 by means of a special ETR interface referred to as the ETR signal. The accuracy of this interface is +/−2.0 microseconds.

Figure 2:
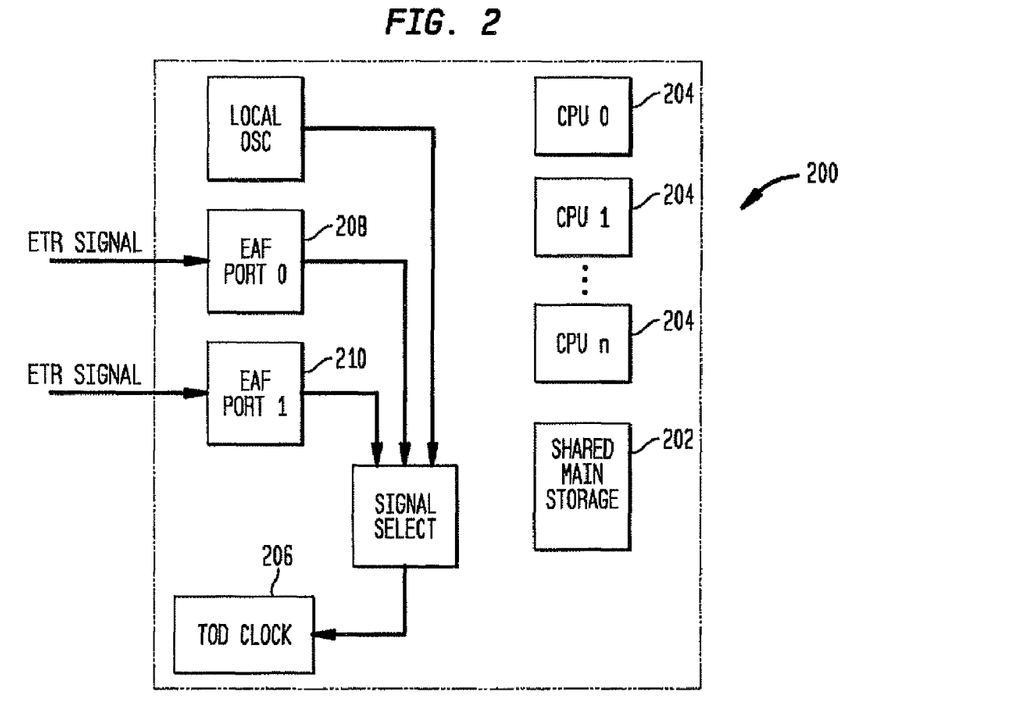
FIG. 2 is a block diagram showing details of a known central processing complex (CPC).

FIG. 2 is a block diagram showing details of a known central processing complex (CPC). A CPC 200, for example, includes shared main storage 202, several CPUs 204, a Time of Day (TOD) clock 206, and an ETR attachment facility (EAF) with two ports 208, 210. The TOD clock 206 in each CPC is set to and synchronized to the ETR. The TOD clock may be stepped to either of the two ETRs, or from the local oscillator. The former case is called ETR stepping mode, the latter, local stepping mode.

Figure 3:
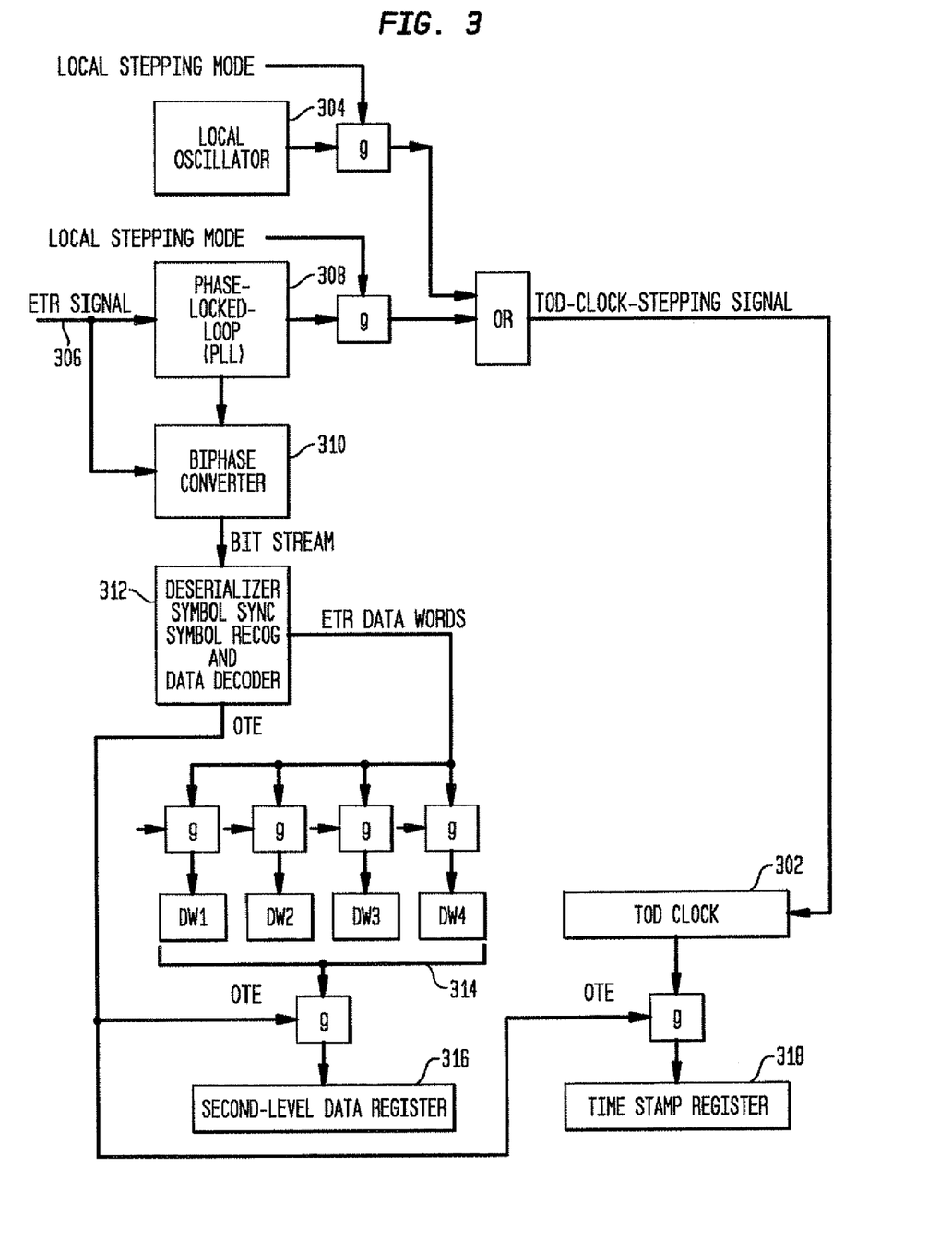
FIG. 3 is a block diagram showing an ETR attachment facility (EAF) without PPS.

FIG. 3 is a block diagram showing an ETR attachment facility (EAF) without PPS. It illustrates the EAF in detail for one EAF port. The TOD clock 302 is incremented by the TOD-clock-stepping signal. In the local stepping mode, this signal comes from a local oscillator 304. In the ETR stepping mode, the signal is derived from the ETR signal 306. The ETR signal 306 drives a phase-locked loop (PLL) 308, and a biphase converter 310 converts the ETR signal into a bit stream. At a module shown at 312, the bit stream is deserialized, symbols are recognized, and data is decoded to obtain the four different ETR data words 314 (DW1-DW4). One of the symbols decoded is the on-time-symbol. Recognition of the on-time symbol causes an on-time event (OTE). The OTE causes the contents of the first-level data register 314 to be gated into the second-level data register 316 and also causes the current contents of the TOD clock 302 to be gated into the time stamp register 318.

As described above, time information is communicated from the ETS by means of the RS-232 interface. In the 9037-1, the timing information is sent from the ETS to the 9037 console. In the 9037-2, the timing information is sent from the ETS directly to the 9037-2. With STP, the role of the 9037 console is performed by the Hardware Maintenance Console (HMC). There is no place to connect an RS-232 interface directly to the central processing complex (CPC), so the RS-232 connections must be made to the HMC in the same manner as with the 9037-1. The only interface available from the HMC to the CPC is the service interface. The service interface is designed to be flexible but not fast. It is used for all communication between human operators and the system and is also used by maintenance personnel to install changes to the Licensed Internal Code. This interface has a very high latency and variance. It is estimated, for example, that for HMC-initiated dial-out, an accuracy of about 100 milliseconds is the best that can be obtained, making the accuracy much worse than even the 9037-1.

An alternative solution is to replace the ETR Attachment Facility (EAF) in the CPC with a new interface card that would include RS-232 and PPS interfaces for input and a new protocol to the CPU to access this information. This solution would involve a substantial effort to define and implement such a new interface. Another option that may be considered is to provide a new stand-alone unit that would include RS-232 and PPS interfaces for input and the current ETR signals as output. This approach would require no change to the CPC as the current EAF would remain unchanged. However, design, implementation and manufacturing of such a unit would take a significant effort. Further, the price of a stand-alone unit would represent a significant increase in cost to a customer. Yet another choice is to use a standard input/output (I/O) communication path directly from the CPC to access timing information via Network Time Protocol (NTP) or other timing mechanisms. Like the other options, however, this would also require a significant design effort as there are no I/O paths available to the native machine.

It would thus be desirable to provide a system and method for achieving time of day accuracy in STP preferably without substantial design and implementation efforts.

SUMMARY OF THE INVENTION

A time synchronization apparatus, method and system are provided. The apparatus in one aspect comprises at least a time of day clock, a first port operable to receive at least first time information using a first time protocol, a second port operable to receive at least second time information using a second time protocol, a third port operable to receive at least a timing signal, and a time stamp register operable to at least capture current value of the time of day clock upon receipt of the timing signal from the third port or the first time information from the first port or combination thereof.

In another aspect, the first port may include a port operable to receive external time reference signals and the first time information may include high quality time information. Yet in another aspect, the second port may include a service interface and the second time information may include time information received over a normal quality interface. Still in another aspect, the third port includes a pulse-per-second signal interface and the timing signal includes a pulse-per-second signal.

A time synchronization system in one aspect may include a central processing complex operable to connect directly to an output port of an external time source for receiving timing pulse signal. A console may be connected to the external time source for receiving timing data; the console may be further connected to the central processing complex for transmitting the timing data to the central processing complex. The central processing complex may be further operable to synchronize its time to the timing data and the pulse-per-second signal. In another aspect, the timing pulse signal includes at least pulse-per-second signal. Yet in another aspect, the console may be connected to the central processing complex via a server interface on the central processing complex.

A method of providing a time synchronization apparatus in one aspect comprises providing a time of day clock, providing a first port for receiving at least first time information using a first time protocol, providing a second port for receiving at least second time information using a second time protocol, providing a third port for receiving at least a timing signal, and providing a time stamp register for at least capturing current value of the time of day clock upon receipt of the timing signal from the third port or the first time information from the first port or combination thereof.

A program storage device readable by a machine, tangibly embodying a program of instructions executable by the machine to perform a method of synchronizing time in computer systems that utilize Server Time Protocol may be also provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENT

Figure 4:
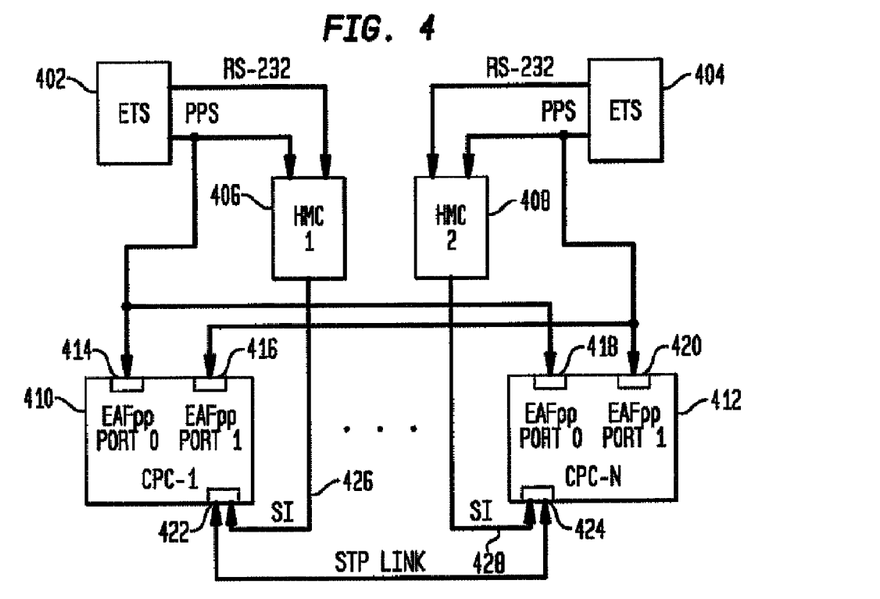
FIG. 4 illustrates an STP network with ETS, RS-232 and PPS in one embodiment of the present disclosure.

FIG. 4 illustrates an STP network with ETS, RS-232 and PPS in one embodiment of the present disclosure. FIG. 4 shows an installation converted to STP (Server Time Protocol) and with PPS added to the ETR attachment facility (EAFpp). In this configuration, the ETS unit 402, 404 is connected to a hardware maintenance console (HMC) 406, 408. The HMC 406, 408 is connected to the CPC 410, 412 by means of the service interface (SI) 426, 428 to the STP engine 422, 424. The normal timing data from the ETS 402, 404 is communicated to the HMC 406, 408 by means of the RS-232 interface, and then it is communicated from the HMC to the CPC 410, 412 by means of the service interface 426, 428. The PPS signal is communicated directly to the EAFpp. The accuracy of this connection without the PPS is about +/−100 milliseconds. Addition of the optional PPS signal to the HMC would not improve this accuracy, as most of the error is in the communication between the HMC and the STP engine, that is, in the service interface. The connection of the PPS signal to the EAFpp, however, provides an accuracy of +/−100 microseconds.

The HMC 406, 408 can obtain the date and time using, for example, the RS-232 interface, to the ETS 402, 404, or it can perform dial-out directly. Once the time has been determined to within 0.5 second, the EAF-PPS attachment is used to determine the time with accuracy to a fraction of a microsecond. After getting the date and time, then as long as the PPS signals are present, it is not necessary to read the date and time on the RS-232 interface or perform dial-out. However, this may be performed, for example, occasionally as a precautionary measure.

Figure 5:
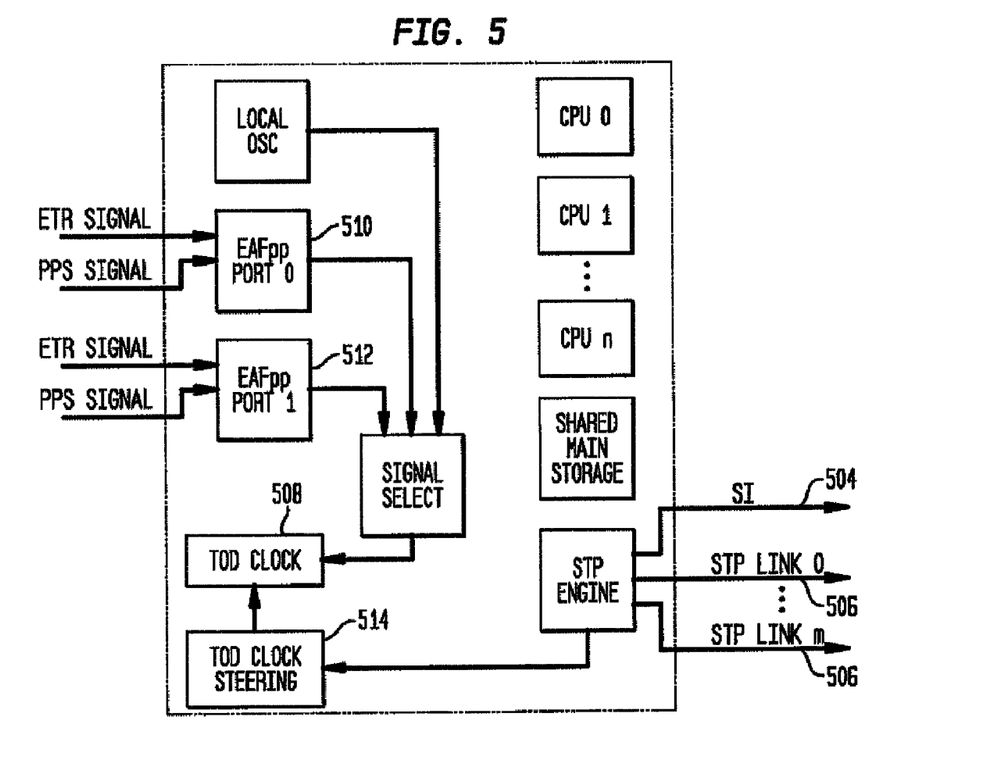
FIG. 5 illustrates a diagram of a central processing complex with STP in one embodiment of the present disclosure.

FIG. 5 is a block diagram illustrating a central processing complex with STP in one embodiment of the present disclosure. FIG. 5 shows a CPC with STP and PPS installed in detail. In one embodiment, each CPC has an STP engine which monitors and controls timing in the STP network. EAFpp ports 510, 512 are operable to receive ETR signals and PPS signals. The ports EAFpp ports 510, 512 may receive ETR only or PPS only or both ETR and PPS signals. The STP engine 502 controls whether the TOD clock 508 is in ETR stepping mode or local stepping mode and selects the EAF port (e.g., 510 or 512) to be used when in ETR stepping mode. By means of the STP links 506, the STP engine exchanges timing messages with the STP engines in other CPCs. It computes differences between the TOD clocks in the STP network and uses this information to adjust TOD-clock steering 514. TOD-clock steering is described in more detail in commonly-owned, co-pending U.S. patent application Ser. No. 11/223,886 entitled "System and Method for TOD-clock Steering," which was filed on Sep. 9, 2005, the whole contents and disclosure of which is incorporated by reference as if fully set forth herein. The STP engine 502 can read information from the EAF second-level data register and time stamp register from both EAF ports 510, 512, even when in the local stepping mode. When a PPS signal is connected to the EAF, the STP engine 502 can read the time stamp register to determine the value of the physical clock at the instant the PPS signal arrived. FIG. 5 shows an ETR signal and a PPS signal into each of the EAF ports, even though in some configurations, no signal is connected. That is, while the CPC may include two EAFpp ports 510, 512 and a service interface (SI) 504, not all of the ports and interfaces 510, 512, 504 need to be used or connected to external devices at the same time. Rather, various connection configurations are possible with the CPC of the present disclosure. For instance, some CPCs may use the EAFpp ports only for ETR signals, some CPCs may use the EAFpp ports only for PPS signals, some CPCs may use EAFpp ports for both ETR and PPS signals, and some CPCs may not use the EAFpp ports.

The STP engine 502 communicates with the hardware maintenance console (HMC) by means of the service interface 504. The HMC communicates to CPC information such as configuration information, status information, and time information. Examples of configuration information may include but is not limited to network identifier (ID), a role this CPC plays in the network such as preferred, backup, arbiter, local clock server, and the like. Examples of status information may include but is not limited to ETS attachment type and operating state and the like. Examples of time information may include but is not limited to year, month, day, hours, minutes, seconds, leap seconds, local time zone and the like. HMC may obtain those and other information from various sources such as the operator, an ETS, dial-out, from an STP engine in one or more of the CPCs in a network. The service interface 504 may include but is not limited to all the information available in the RS-232.

Figure 6:
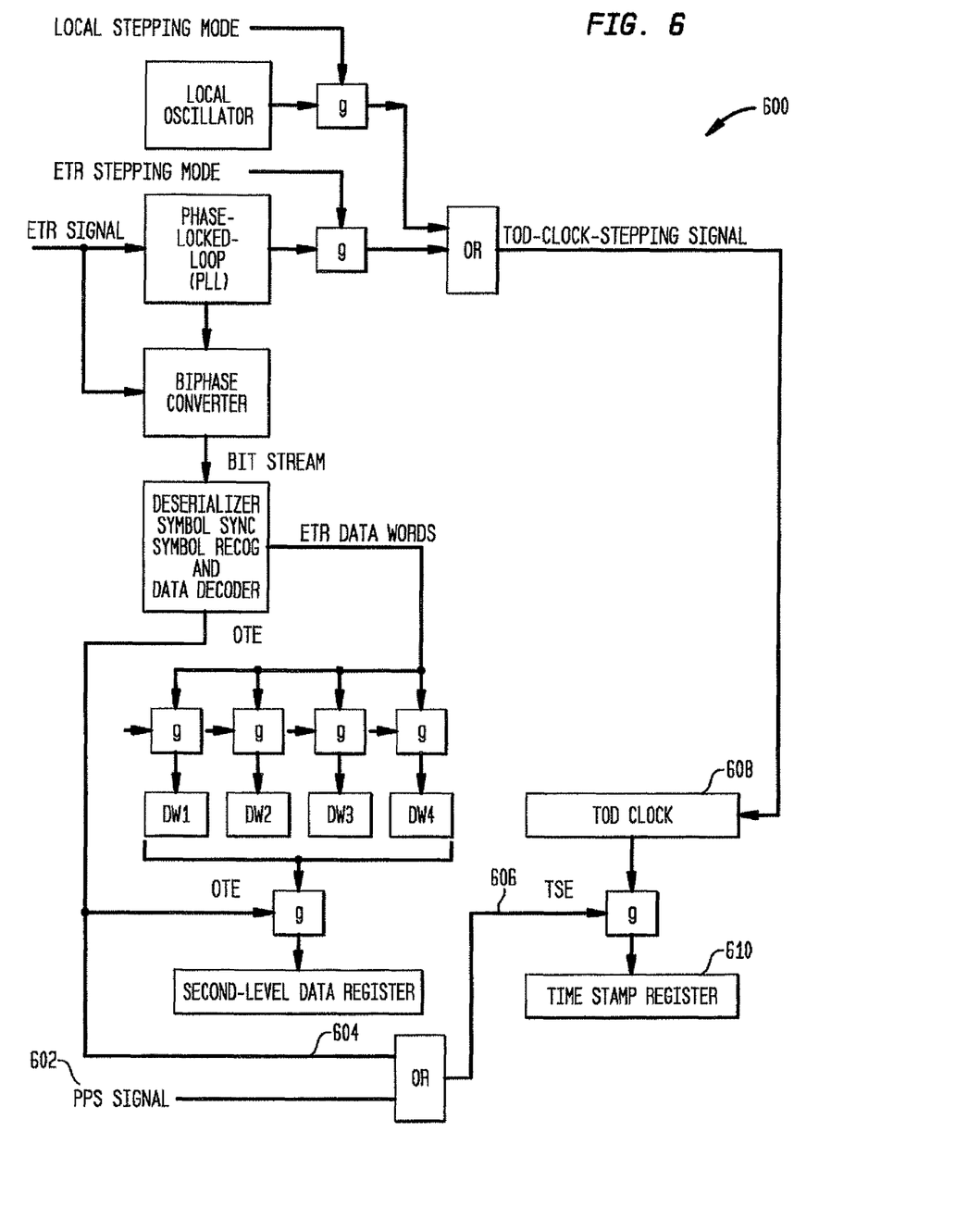
FIG. 6 illustrates an ETR attachment facility with PPS (EAFpp) in one embodiment of the present disclosure.

FIG. 6 illustrates an ETR attachment facility with PPS (EAFpp) in one embodiment of the present disclosure. The PPS signal 602 from the ETS is connected directly to the EAFpp 600. This signal is ORed with the OTE 604 to form a time-stamp event (TSE) 606. The current value of the TOD clock 608 is gated into the time stamp register 610 by signal TSE 606. In one embodiment, the time stamp register 610 may be used for both ETR signals and PPS signals. This design allows one function for the STP engine to read the register 610 in several different configurations including but not limited to the configurations shown in FIG. 4 and FIG. 7. For instance, no additional instructions for the STP engine may be needed when PPS is attached. TOD clock 608 provides a high-resolution measure of real time, suitable for the indication of date and time of day. It may be a 64-bit unsigned binary counter. Conceptually, the TOD clock 608 is incremented so that 1 is added into the low-order bit position (bit 63) every $2^{-12}$ microsecond (1/4096 microsecond). Actual TOD-clock implementations may not provide a full 64-bit counter, but maintain an equivalent stepping rate (rate at which the bit positions change) by incrementing a higher-order bit position at a correspondingly lower rate.

Figure 7:
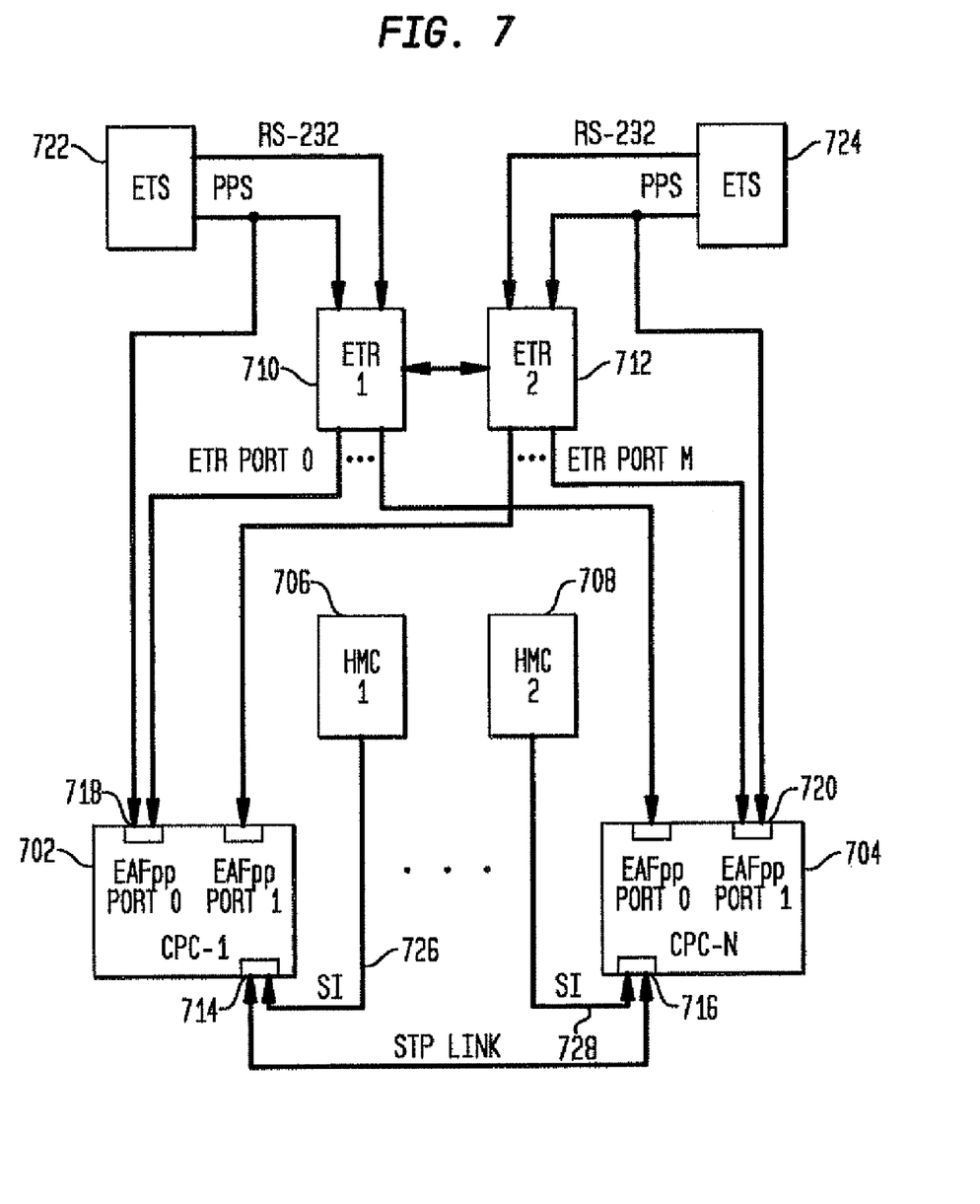
FIG. 7 illustrates a mixed network with ETS, RS-232, PPS, and STP in one embodiment of the present disclosure.

FIG. 7 illustrates a mixed network with ETS, RS-232, PPS, and STP in one embodiment of the present disclosure, for example, partly migrated to STP. In this hybrid combination of HMC 706, 708 and the ETR attachment facility with PPS (EAFpp), the HMC 706, 708, for example, is connected to the CPC 702, 704 respectively, by means of the service interface 726, 728 to the STP engine 714, 716 respectively. The EAFpp 718, 720 is expanded to include a PPS connection. The PPS signal is communicated directly to the EAFpp 718, 720. ETR units 710, 712 receive timing information from the ETS by means of the RS-232 interface and timing pulse from an optional pulse-per-second connection. The ETR units 710, 712 communicate the timing information to each CPC 702, 704.

In this configuration, a CPC 702, 704 may use either the ETR signal or the PPS signal. Such a configuration is useful for testing as it permits the PPS signal to be used to verify the accuracy of the mixed network. Connection to the PPS before converting to the STP-only configuration also permits the PPS connections to be verified before final conversion.

Generally, the OTE 604 sent by the ETR occurs every 2020 microseconds (1.048576 seconds), while the PPS 602 occurs every 1.00000 seconds. Thus, it is possible to connect the PPS 602 and the ETR to the EAF at the same time and read information from both with very little interference. The two signals coincide every 214 (16,384) seconds, or about once every four and one-half hours. Given at least three time stamps it is a very simple programming task to determine which input each time-stamp value represents.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. For instance, a program storage device readable by a machine, tangibly embodying a program of instructions executable by the machine to perform the described functionalities and/or methods may be provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The invention claimed is:

1. A method of synchronizing time in computer systems that utilize Server Time Protocol, comprising:
    establishing a time of day clock;
    receiving at a first port at least first time information using first time protocol;
    receiving at a second port at least second time information using a second time protocol;
    receiving at a third port at least a timing signal;
    capturing at a time stamp register at least current value of the time of day clock upon receipt of the timing signal from the third port or the first time information from the first port or combination thereof;
    monitoring and controlling at a server time protocol engine the timing in a server time protocol network;
    controlling at the server time protocol engine whether the time of day clock is in external time reference stepping mode or local stepping mode; and
    determining at the server time protocol engine physical clock value when a pulse-per-second signal arrives by reading information at least from the time stamp register.

2. The method of claim 1, further including:
    receiving external time reference signals at the first port.

3. The method of claim 1, wherein the first time information includes high quality time information.

4. The method of claim 1, wherein the second port includes a service interface.

5. The method of claim 1, wherein the second time information includes time information received over a normal quality interface.

6. The method of claim 1, wherein the third port includes a pulse-per-second signal interface.

7. The method of claim 1, wherein the timing signal includes a pulse-per-second signal.

8. A program storage device readable by a machine, tangibly embodying a program of instructions executable by the machine to perform a method of synchronizing time in computer systems that utilize Server Time Protocol, comprising:
    establishing a time of day clock;
    receiving at a first port at least first time information using first time protocol;
    receiving at a second port at least second time information using a second time protocol;
    receiving at a third port at least a timing signal;
    capturing at a time stamp register at least current value of the time of day clock upon receipt of the timing signal from the third port or the first time information from the first port or combination thereof;
    monitoring and controlling at a server time protocol engine the timing in a server time protocol network;
    controlling at the server time protocol engine whether the time of day clock is in external time reference stepping mode or local stepping mode; and
    determining at the server time protocol engine physical clock value when a pulse-per-second signal arrives by reading information at least from the time stamp register.

9. The program storage device of claim 8, further including:
    receiving external time reference signals at the first port.

10. The program storage device of claim 8, wherein the first time information includes high quality time information.

11. The program storage device of claim 8, wherein the second port includes a service interface.

12. The program storage device of claim 8, wherein the second time information includes time information received over a normal quality interface.

13. The program storage device of claim 8, wherein the third port includes a pulse-per-second signal interface.

14. The program storage device of claim 8, wherein the timing signal includes a pulse-per-second signal.

* * * * *